(12) United States Patent
Lyon et al.

(10) Patent No.: US 10,570,840 B2
(45) Date of Patent: Feb. 25, 2020

(54) SYSTEM AND METHOD GENERATING AN EXOTHERM IN AN EXHAUST SYSTEM

(71) Applicant: Ford Global Technologies, LLC, Dearborn, MI (US)

(72) Inventors: Peter Mitchell Lyon, Birmingham, MI (US); Nanci Ray, Canton, MI (US); Joseph Goode, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/892,020

(22) Filed: Feb. 8, 2018

(65) Prior Publication Data

US 2019/0242311 A1  Aug. 8, 2019

(51) Int. Cl.
  *F02D 41/02*   (2006.01)
  *F02D 41/00*   (2006.01)
  *F02D 41/40*   (2006.01)
  *F02D 41/38*   (2006.01)

(52) U.S. Cl.
  CPC ......... *F02D 41/025* (2013.01); *F02D 41/008* (2013.01); *F02D 41/024* (2013.01); *F02D 41/0245* (2013.01); *F02D 41/401* (2013.01); *F02D 41/405* (2013.01); *F02D 2041/389* (2013.01); *F02D 2200/0802* (2013.01)

(58) Field of Classification Search
  CPC .. F02D 41/008; F02D 41/024; F02D 41/0245; F02D 41/025; F02D 41/405
  See application file for complete search history.

(56) References Cited

U.S. PATENT DOCUMENTS

| | | | | |
|---|---|---|---|---|
| 2002/0194837 A1* | 12/2002 | Fluga | ................... | F01N 3/2006 60/284 |
| 2004/0133334 A1 | 7/2004 | Nakano et al. | | |
| 2006/0157019 A1 | 7/2006 | Dietl et al. | | |
| 2009/0090099 A1* | 4/2009 | Wu | ....................... | F02D 41/008 60/295 |
| 2015/0040560 A1* | 2/2015 | Jozsa | ................. | F02D 41/0065 60/602 |
| 2015/0285180 A1* | 10/2015 | Prothmann | ........... | F02D 41/008 123/672 |

FOREIGN PATENT DOCUMENTS

WO    WO-2015008106 A1 *  1/2015  ......... F02D 41/0082

\* cited by examiner

*Primary Examiner* — Audrey K Bradley
(74) *Attorney, Agent, or Firm* — Geoffrey Brumbaugh; McCoy Russell LLP

(57) ABSTRACT

Methods and systems for operating an engine to provide small amounts of energy to heat an aftertreatment device are described. In one example, fewer than the actual total number of engine cylinders are supplied with late post fuel injections (LPI) to heat an aftertreatment device without heating the aftertreatment device more than is desired. The engines fuel injectors may be operated at minimum fuel pulse widths to reduce fuel consumption.

19 Claims, 6 Drawing Sheets

SYSTEM AND METHOD GENERATING AN EXOTHERM IN AN EXHAUST SYSTEM

BACKGROUND/SUMMARY

A diesel engine may include one or more aftertreatment devices in an exhaust system coupled to the diesel engine. The aftertreatment devices may operate more efficiently when they are operating at temperatures that are greater than a threshold temperature (e.g., a light off temperature where aftertreatment device efficiency is greater than a threshold efficiency, such as 50%). One way to increase aftertreatment device temperature is to throttle the engine (e.g., partially close an engine intake throttle) and modify the start of fuel injection timing to adjust combustion phasing. However, engine noise, engine vibration, and engine efficiency metrics may limit the extent to which the engine out exhaust gas temperature may be increased to improve aftertreatment device efficiency.

Temperature of the aftertreatment device may also be increased via providing late post fuel injections (hereinafter referred to as LPIs) into the engine's cylinders. LPIs are injected after complete combustion of a main fuel injection pulse in a cylinder and before the exhaust valve(s) of a cylinder receiving the main fuel injection pulse closes during the cylinder's cycle. The LPIs may combust in the cylinder or in the exhaust system (e.g., within an oxidation catalyst) to elevate temperatures of exhaust gases that are directed to the aftertreatment device, thereby elevating the temperature of the aftertreatment device. However, injecting even small amounts of fuel in LPIs may increase the aftertreatment temperature more than is desired. Therefore, it is desirable to provide a way of increasing aftertreatment device temperature without increasing aftertreatment device temperature more than is desired.

The inventors herein have recognized the above-mentioned disadvantages and have developed an engine operating method, comprising: providing LPIs to all or fewer than all of the total number of engine cylinders available. This method is performed via a controller in response to feedback that providing a threshold amount of fuel in LPIs to each of the cylinders included in the total number of engine cylinders provides more fuel than is necessary to increase a temperature of an aftertreatment device a specified amount.

By providing LPIs to only a fraction of the total number of engine cylinders, it may be possible to increase a temperature of an aftertreatment device without increasing the temperature more than is desired. Further, fuel usage may be reduced since excess fuel may not be provided to increase the aftertreatment device temperature more than is desired. In one example, fuel supplied by fuel injectors may be supplied at minimum fuel pulse widths to ensure control of aftertreatment device temperature and repeatable delivery of small fuel amounts.

The present description may provide several advantages. In particular, the approach may allow for aftertreatment temperature control at low engine loads. In addition, the approach may decrease fuel consumption to heat aftertreatment devices. Further, the approach may reduce the possibility of producing more heat than may be desired in an aftertreatment device.

The above advantages, other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
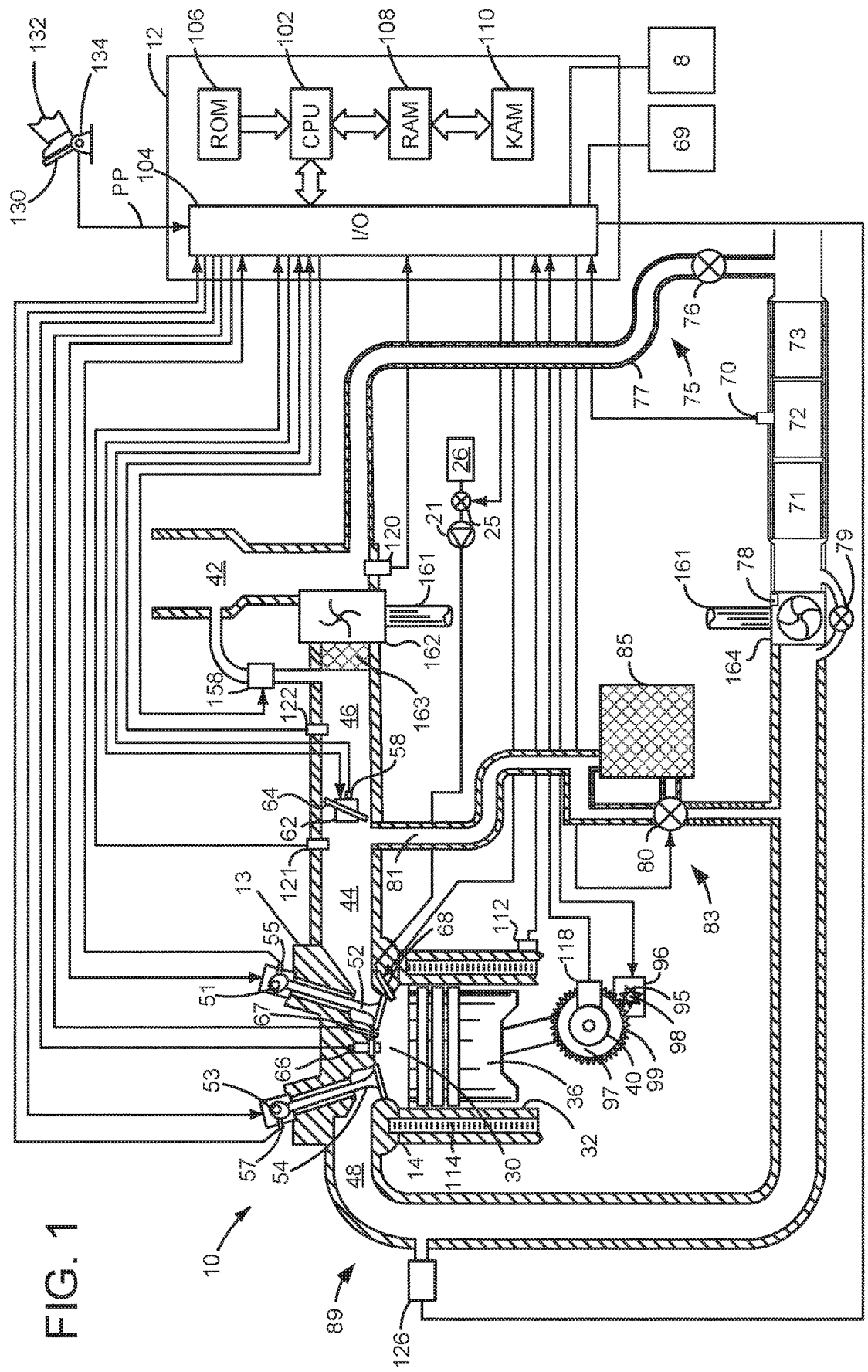
FIG. 1 shows a schematic depiction of an example engine.
Figure 2:
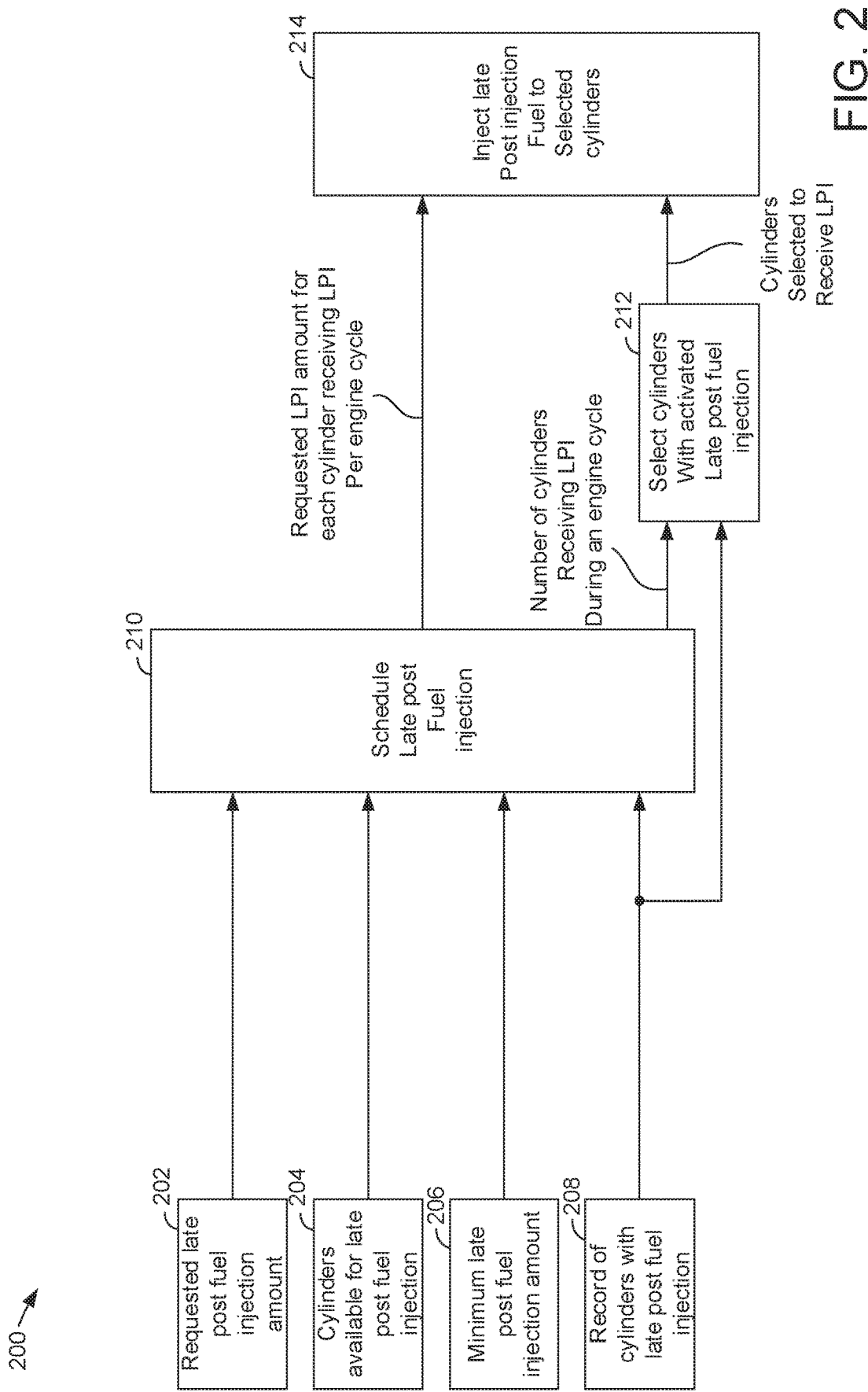
FIG. 2 shows a block diagram for late post fuel injection of fuel to an engine.
Figure 3:
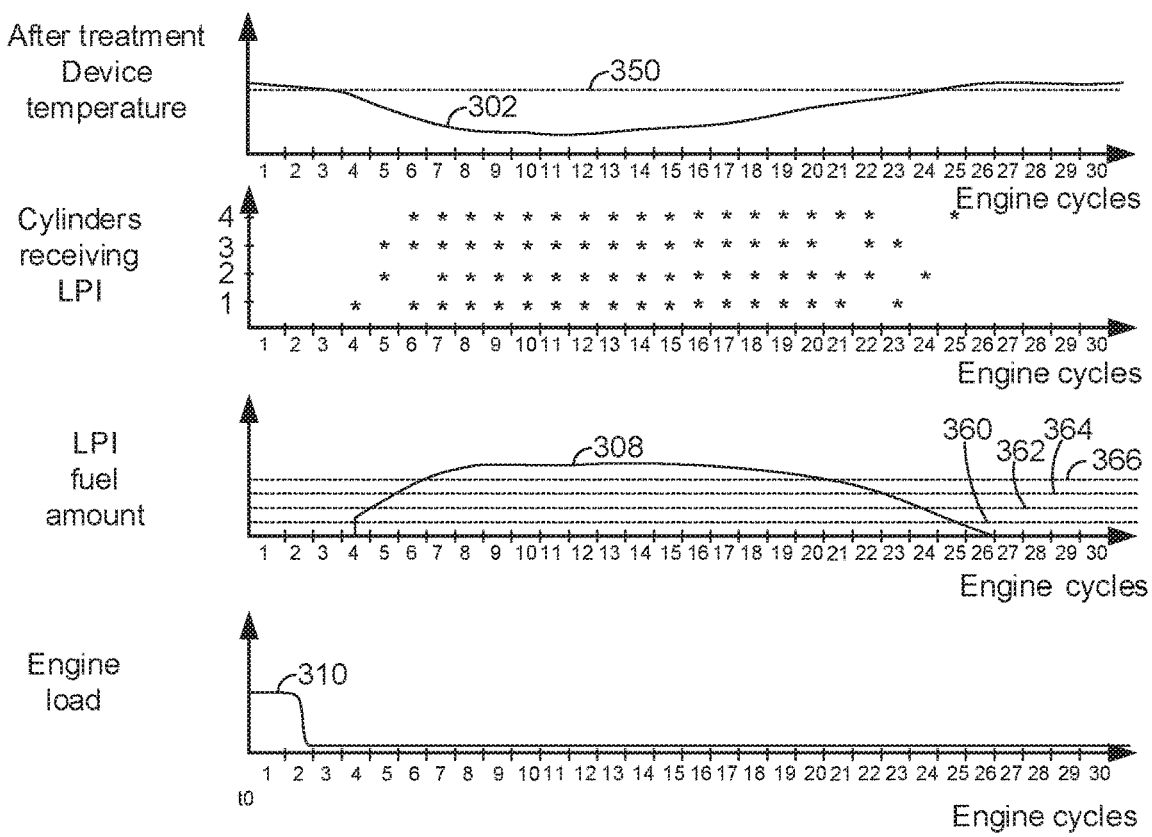
FIG. 3 shows an example engine operating sequence according to the method of FIGS. 4 and 5.
Figure 4:
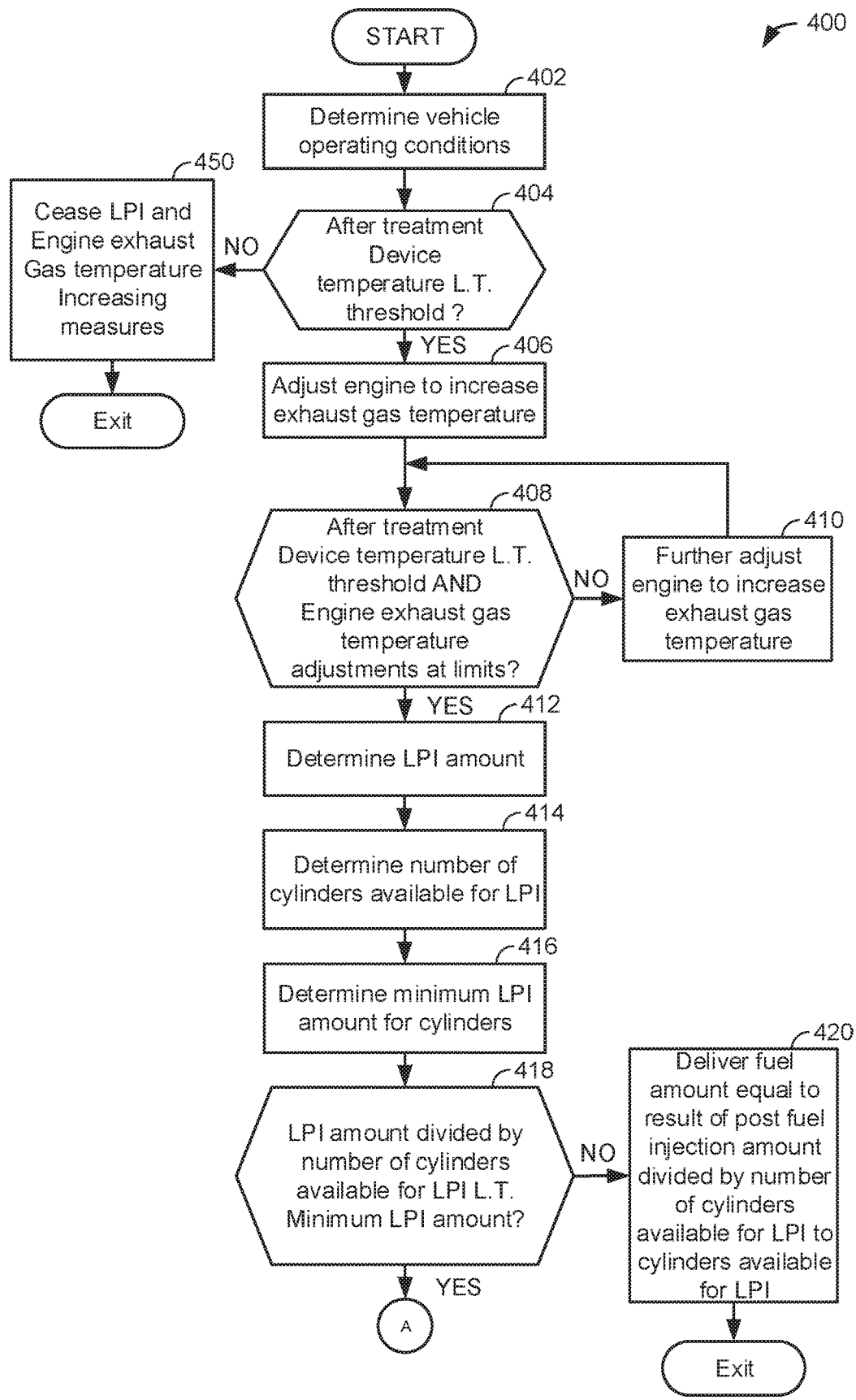
FIGS. 4 and 5 show an example method for operating an engine of the type shown in FIG. 1.
Figure 5:
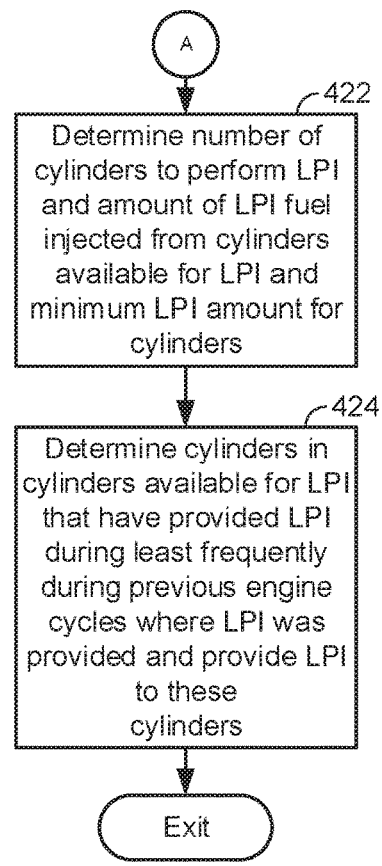
Figure 6:
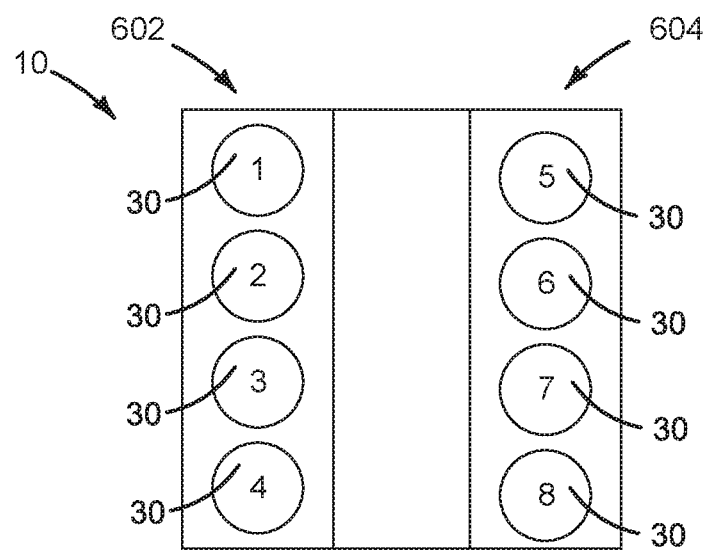
FIG. 6 shows an example engine including a plurality of cylinders.
Figure 7:
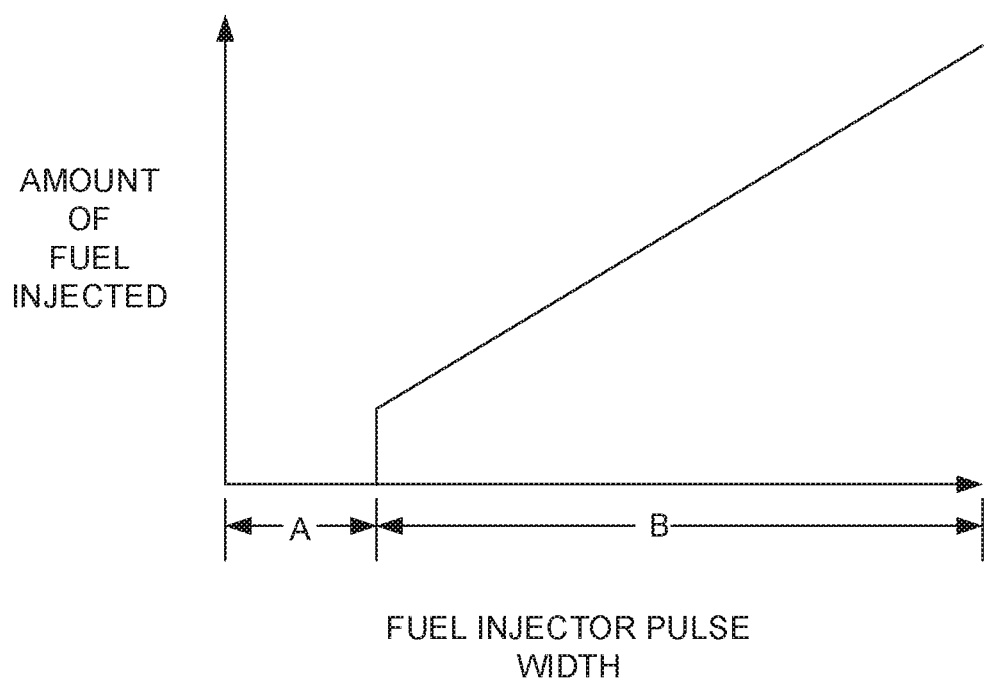
FIG. 7 shows an example operating range for a fuel injector.

The present description is related to operating a diesel engine that may include an exhaust aftertreatment device. FIG. 1 shows one example of a boosted diesel engine that includes one or more exhaust aftertreatment devices. FIG. 2 shows a simplified block diagram for controlling LPI to an engine. An example engine operating sequence for the diesel engine of FIG. 1 according to the method of FIGS. 4 and 5 is shown in FIG. 3. A method for operating an engine and providing LPIs of fuel to the engine is shown in FIGS. 4 and 5. The engine may include a plurality of cylinders as is shown in FIG. 6. The engine may include fuel injectors that operate as is shown in FIG. 7.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored in controller memory.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position of a valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin the turbine 164 which is coupled to the compressor 162 via a shaft 161. Compressor speed may be adjusted via adjusting the position of variable vane control 78 or compressor bypass valve 158. In alternative examples, a wastegate 79 may replace or be used in addition to variable vane control 78. Variable vane control 78 adjusts the position of variable geometry turbine vanes. When vanes are in an open position, exhaust gases passing through the turbine 164 supply little energy to rotate the turbine 164. When vanes are in a closed position, exhaust gases passing through the turbine 164, impart increased force on the turbine 164. Alternatively, a wastegate 79 or a bypass valve allows exhaust gases to flow around the turbine 164 to reduce the amount of energy supplied to the turbine. A compressor bypass valve 158 allows compressed air at the outlet of the compressor 162 to return to the inlet of the compressor 162. In this way, the efficiency of the compressor 162 is to affect the flow of the compressor 162 and reduce the possibility of compressor surge.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and controller 12 may monitor battery state of charge.

Combustion is initiated in the combustion chamber 30 when fuel automatically ignites when combustion chamber temperatures reach the auto-ignition temperature of the fuel when the piston 36 is near top-dead-center of the compression stroke. In some examples, a universal Exhaust Gas Oxygen (UEGO) sensor 126 may be coupled to the exhaust manifold 48 upstream of the emissions device 71. In other examples, the UEGO sensor may be located downstream of one or more of the exhaust aftertreatment devices. Further, in some examples, a NOx sensor that has both NOx and oxygen sensing elements may replace the UEGO sensor.

At lower engine temperatures, a glow plug 66 may convert electrical energy into thermal energy to create a hot spot next to one of the fuel spray cones of the injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via pressure sensor 67.

Exhaust system 89 includes emissions aftertreatment device 71 can include an oxidation catalyst and it may be followed by a selective catalytic reduction (SCR) catalyst 72 and a diesel particulate filter (DPF) 73, in one example. In another example, DPF 73 may be positioned upstream of SCR 72. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may bypass EGR cooler 85, or alternatively, EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. In some examples, low pressure EGR system 75 may also include a low pressure EGR cooler. A charge air cooler 163 may be provided downstream of compressor 162 to cool air entering engine 10.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold absolute pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 may provide for an engine system, comprising: a diesel engine including a plurality of cylinders and fuel injectors supplying fuel to the cylinders; and a controller including executable instructions stored in non-transitory memory to supply LPI to fewer than the actual total number of cylinders included in the engine. The engine system of claim 15, further comprises additional instructions to provide the LPIs to fewer than the actual total number of engine cylinders via the controller in response to an indication that providing a threshold amount of fuel in LPIs to each of the plurality of cylinders provides more than a requested amount of fuel to increase a temperature of an aftertreatment device. The engine system further comprises additional instructions to select one or more of the plurality of cylinders to receive a LPI from the fuel injectors operated at a shortest duration fuel pulse width that is in a linear operating region of the fuel injectors based on a past history of providing LPI from the fuel injectors. Additionally, the engine system contains additional instructions to adjust operation of the diesel engine to increase temperature of exhaust gases produced via the diesel engine. Further, the engine system may supply LPI in response to a temperature of an aftertreatment device that is in fluidic communication with the diesel engine. The engine system further comprises additional instructions to determine an actual total number of the plurality of cylinders receiving the LPI.

Referring now to FIG. 2, an example block diagram for providing LPI to a diesel engine is shown. The block diagram may be implemented via executable instructions stored in controller memory, controller hardware, and the vehicle components shown in FIG. 1.

At block 202, block diagram 200 determines a requested LPI amount. In one example, the requested LPI amount is retrieved from a function or table that holds empirically determined amounts of LPI. The table or function may be referenced or indexed in response to a desired exotherm (e.g., a temperature increase of an aftertreatment device from the aftertreatment device's present temperature). The LPI amount may be indicated in grams/engine cycle or other appropriate units. Thus, if it is desired to increase temperature of the exhaust aftertreatment device by 5° C., the table or function may be referenced by the value of 5° C. The table outputs an amount of LPI that corresponds to the 5° C. exotherm and the value is provided to block 210. If a fuel amount greater than the requested LPI amount is provided to engine cylinders as a LPI, then the aftertreatment device temperature may increase more than is desired, thereby increasing fuel consumption with no incremental benefit from the higher than desired temperature.

At block 204, block diagram 200 determines cylinders that are available to receive LPIs to increase aftertreatment device temperature. The cylinders that are available to receive LPIs may depend on engine operating conditions including but not limited to driver demand torque, active/deactivated cylinder operating modes, cylinder bank associated with the aftertreatment device for which a temperature increase is desired, and minimum engine temperature for supplying LPI.

For example, during part engine load conditions when driver demand is greater than a first threshold but less than a second threshold, some engine cylinders may be deactivated. The intake and exhaust valves of the deactivated cylinders may be held closed for more than one engine cycle (e.g., four strokes of an engine cylinder). Therefore, LPI to deactivated cylinders may not be allowed since the injected fuel would not be directed to the aftertreatment device in a timely manner. Thus, the deactivated cylinders may not be available for LPI.

In another example, it may be desirable to increase a temperature of an aftertreatment device that is in fluidic communication with cylinders included in a first bank of engine cylinders but not cylinders included in a second bank. Cylinders included in the second bank of engine cylinders are not available for LPIs to raise the temperature of the aftertreatment device that is in fluidic communication with the first bank of engine cylinders but not the second bank of engine cylinders because LPIs to cylinders in the second bank of engine cylinders would have no effect on increasing temperature of the aftertreatment device that is in sole fluidic communication with cylinders included in the first bank of engine cylinders.

In still another example, no engine cylinders may be available for LPI when engine temperature is less than a threshold temperature. Providing LPI to engine cylinders at very low engine temperatures right after an engine start may not be as beneficial as is desired to increase the temperature of the aftertreatment device. Therefore, engine cylinders may not be available for LPI.

Block 204 evaluates which engine cylinders are available to receive LPI based on vehicle operating conditions and outputs the identity of cylinders available for LPI to increase the temperature of the aftertreatment device having a temperature that is less than a desired temperature to block 210.

Block 206 provides a minimum LPI amount that may be provided to engine cylinders. The minimum LPI amount may be based on a minimum fuel injector pulse width. The minimum fuel injector pulse width may be the lowest fuel injector pulse width that provides a repeatable amount of fuel from the fuel injector and is proportionate to the pulse width. For example, a fuel injector minimum pulse width may be 100 microseconds to provide X grams of fuel. If the fuel injector is commanded by a pulse width less than 100 microseconds, then the fuel injector may provide an amount of fuel that is not proportional to the pulse width. Thus, output of the fuel injector may be linear for pulse widths greater than 100 microseconds and non-linear for pulse widths of less than 100 microseconds. The minimum LPI amount may be equal to the amount of fuel provided by a fuel injector at the fuel injector's minimum pulse width. Consequently, LPIs may not be commanded to provide a fuel amount that is less fuel than the fuel quantity that corresponds to the injector's minimum pulse width. Block 206 provides the minimum LPI amount to block 210.

Block 208 retains a record of engine cylinders that have received LPIs during the most recent engine cycles when LPIs were requested. In one example, block 208 contains a record of engine cylinders that have received LPIs for a predetermined number of engine cycles (e.g., 50) over past engine cycles when LPIs were requested. The record may be a vector or array that includes cylinders to which LPIs were provided during each engine cycle for the predetermined number of engine cycles. For example, the array or vector may hold a record of cylinder numbers 1 and 4 receiving LPIs during a first engine cycle when cylinder numbers 2 and 3 do not receive LPIs. The array or vector may also hold a record of cylinder numbers 2 and 3 receiving LPIs during a second engine cycle when cylinder numbers 1 and 4 do not receive LPIs. Block 208 provides the record of engine cylinders that have received LPIs during the predetermined number of engine cycles when LPIs were requested.

Block 210 schedules LPIs for engine cylinders. In particular, block 210 outputs an actual total number of cylinders receiving LPIs for the present or next engine cycle depending on the engine's particular position and time of inquiry to block 212. Block 210 also outputs a requested LPI amount for each cylinder receiving LPI during each engine cycle to block 214. In one example, block 210 divides the requested LPI amount by the actual total number of cylinders that are available to receive LPI. If the result of the division is less than the amount of fuel injected for a minimum LPI, then the actual total number of cylinders that are available to receive LPI is reduced by one and the division is performed again. This process is repeated until the requested LPI amount for each cylinder receiving LPI each engine cycle is greater than the minimum LPI amount. The result of the most recent division is the requested LPI amount for each cylinder receiving LPI each engine cycle. The actual total number of cylinders receiving LPI is the lowest number of actual total number of cylinders that are available to receive LPI.

For example, if an engine has four cylinders and all four cylinders are available for LPI, the requested amount of LPI is 0.1 gram/engine cycle, and the minimum LPI amount is 0.03 grams/engine cycle, then block 210 divides 0.1 gram/engine cycle by a value of four to produce a result of 0.025, which is less than 0.03. So, the actual total number of cylinders that are available to receive LPI is reduced to 3 and then the requested LPI amount of 0.1 gram/engine cycle is divided by 3 to yield a result of 0.0333, which is greater than 0.03. Therefore, the actual total number of cylinders receiving LPI during an engine cycle is three (the number that the actual total number of cylinders that are available to receive LPI has been reduced to) and the requested LPI amount for each cylinder receiving LPI each engine cycle is 0.0333 gram/engine cycle.

Block 212 outputs cylinders selected to receive fuel during an engine cycle. In one example, block 212 selects engine cylinders that have provided the least number of LPIs according to LPI records for a predetermined number of times LPI has been requested. Further, the actual total number of cylinders selected from the cylinders that have provided the least number of LPIs is equal to the actual total number of cylinders receiving LPI as received from block 210.

For example, if the engine is a four cylinder engine where all four cylinders are available to receive LPI, the actual total number of cylinders receiving LPI is two, and LPIs provided in the past by the engine cylinders are: cylinder 1: 12 injections; cylinder 2: 14 injections; cylinder 3: 13 injections; and cylinder 4: 11 injections, then block 212 selects cylinders 1 and 4 to receive fuel for the present or next engine cycle since these cylinders have received fewer LPIs than cylinders 2 and 3. In this way, the actual total number of LPIs provided to each of the engine cylinders may be maintained substantially equal (e.g., within 10 injections) so that fuel injector wear may be equalized throughout the engine. In addition, block 212 may select cylinders based on engine firing order so that LPIs are provided at equal crankshaft degree intervals so that flow of fuel to the exhaust system is evenly distributed in crankshaft degrees during an engine cycle. Block 212 outputs the cylinders that have been selected to receive LPIs to block 214.

Block 214 injects fuel to the cylinders selected by block 212 to receive LPI. Each of the cylinders selected to receive LPI receives the same amount of LPI.

Referring now to FIG. 3, a prophetic engine operating sequence according to the method of FIGS. 4 and 5 is shown. The sequence of FIG. 3 may be provided via the system of FIG. 1 in cooperation with the method of FIGS. 4 and 5. The plots of FIG. 3 are time aligned and occur at the same time. The engine system described herein may operate and include non-transitory instructions to operate the engine under all conditions included in the descriptions of FIG. 3. The sequence of FIG. 3 is applicable to a four cylinder engine having four strokes per cylinder for each engine cycle (e.g., 720 crankshaft degrees). In this example, engine speed is held constant for simplicity.

The first plot from the top of FIG. 3 represents aftertreatment device temperature versus engine cycle number (e.g., each engine cycle is 720 degrees and includes four strokes for each engine cylinder). Trace 302 represents aftertreatment device temperature. The vertical axis represents aftertreatment device temperature and increases in the direction of the vertical axis arrow. The horizontal axis represents engine cycle and increases from the left side to right side of the figure. Horizontal line 350 represents a threshold aftertreatment device temperature. The aftertreatment device operates less efficiently than is desired when its temperature is less than the temperature represented by line 350. In one example, horizontal line 350 represents an aftertreatment device light off temperature. Thus, it may be desirable to operate the aftertreatment device at a temperature that is above the temperature of line 350.

The second plot from the top of FIG. 3 indicates which cylinders are receiving LPIs during each of the illustrated engine cycles. The vertical axis represents cylinders receiving LPIs during an engine cycle. The engine cylinder numbers are indicated along the vertical axis. An engine cylinder that receives LPI during a cylinder cycle is indicated by *. The horizontal axis represents engine cycle and increases from the left side to right side of the figure.

The third plot from the top of FIG. 3 represents a requested amount of LPI for each engine cycle. Trace 308 represents the requested amount of LPI for each engine cycle. The vertical axis represents the requested amount of LPI for each engine cycle and increases in the direction of the vertical axis arrow. The horizontal axis represents engine cycle and increases from the left side to right side of the figure. Horizontal line 360 represents a minimum LPI amount if LPI is delivered to only a single cylinder of the engine. Horizontal line 362 represents a minimum LPI amount if LPI is delivered to only two cylinders of the engine. Horizontal line 364 represents a minimum LPI amount if LPI is delivered to only three cylinders of the engine. Horizontal line 366 represents a minimum LPI amount if LPI is delivered to all four cylinders of the engine.

The fourth plot from the top of FIG. 3 represents engine load versus engine cycle. Trace 310 represents engine load. The vertical axis represents engine load and increases in the direction of the vertical axis arrow. The horizontal axis represents engine cycle number and increases from the left side to right side of the figure.

At engine cycle number 1 (indicated by the number one along the horizontal axis of each plot), the aftertreatment device temperature is greater than threshold 350 and no engine cylinders are receiving LPI. The LPI amount is zero since LPI is not presently needed to warm the aftertreatment device and engine load is at a middle level.

Near engine cycle number two, the engine load is reduced via a driver releasing an accelerator pedal (not shown). The aftertreatment device temperature begins to decline after the engine load is reduced. At engine cycle number four the aftertreatment device temperature falls below threshold 350, but since the aftertreatment device temperature is still near threshold 350, the amount of LPI is just above threshold 360. Cylinder number one is the only cylinder selected to receive LPI during engine cycle number four as indicated by the single * in the second plot from the top of FIG. 3 at engine cycle number four.

At engine cycle number five the aftertreatment device temperature continues to decline due to the lowered engine load. Therefore, the LPI amount is increased to a level greater than threshold 362 but less than threshold 364. As such, the amount of LPI is increase by allowing LPI in two engine cylinders during engine cycle number five. LPI is injected to cylinder numbers two and three in engine cycle number five so that the number of LPIs provided to cylinder number one does not increase. At engine cycle number six the aftertreatment device temperature continues to decrease so the LPI amount is increased such that LPI is injected to three cylinders to meet the LPI amount requested in the third plot from the top of FIG. 3. The engine load remains at a lower level.

At engine cycle number seven, the amount of LPI is increased to allow all four engine cylinders to receive LPI. By supplying LPI to all the engine cylinders, the temperature of the exhaust gases heated by LPI to heat the aftertreatment device may be made more uniform due to late post injected injections being spaced more closely in time as compared to if LPI were supplied by only one or two cylinders. LPI is provided to all four engine cylinders during engine cycles 7-20 in the amount requested as shown in the third plot from the top of FIG. 3.

During engine cycles 21-25, the aftertreatment device temperature begins to approach threshold 350 each engine cycle. Therefore, the LPI amount is decreased and the actual total number of cylinders that receive LPI is reduced. Further, the cylinders that receive LPI are rotated or changed so that the total number of LPIs provided to each cylinder is equalized between all engine cylinders. Thus, at engine cycle number twenty one, cylinder numbers 1, 2, and 4 receive LPI. Then, at engine cycle number twenty two, cylinder numbers 2-4 receive LPI. And so on as is noted in the second plot from the fop of FIG. 3.

In this way, small amounts of fuel may be supplied to engine cylinders as LPI so that the aftertreatment device may be kept above a threshold temperature without injecting excess fuel that may increase aftertreatment device temperature more than is desired. Further, the cylinders that receive the LPI may be alternated so that fuel injectors that supply the fuel may degrade at a more consistent rate between the engine cylinders. As such, the life cycles of each of the fuel injectors may be extended. In some examples, engine operation may also be adjusted to increase the temperature of exhaust gases produced within the engine to increase the aftertreatment device temperature when the aftertreatment device temperature is less than threshold 350.

Referring now to FIGS. 4 and 5, a method for operating an engine is shown. In particular, a flowchart of a method for operating an internal combustion engine is shown. The method of FIGS. 4 and 5 may be stored as executable instructions in non-transitory memory in systems such as shown in FIG. 1. The method of FIGS. 4 and 5 may be incorporated into and may cooperate with the systems of FIG. 1. Further, at least portions of the method of FIGS. 4 and 5 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 400 may determine selected control parameters from sensor inputs. Further, controller instructions may be provided for operating an engine at all the engine operating conditions described herein.

At 402, method 400 determines vehicle operating conditions. Vehicle operating conditions may include but are not limited to engine temperature, accelerator pedal position, aftertreatment device temperature, ambient temperature, ambient barometric pressure, driver demand torque, engine speed, and engine load. Vehicle operating conditions may be determined via vehicle sensors and the engine controller described in FIG. 1.

At 404, method 400 judges if aftertreatment device temperature is less than a threshold temperature (e.g., a predetermined aftertreatment device light off temperature). Method 400 may judge if one or more aftertreatment devices that are in fluidic communication with different engine cylinder banks are operating at temperatures less than the threshold temperature. For example, method 400 may judge if a first aftertreatment device that is in fluidic communication with a first cylinder bank and not a second cylinder bank is operating at less than a threshold temperature. Further, method 400 may judge if a second aftertreatment device that is in fluidic communication with a second cylinder bank and not the first cylinder bank is operating at less than a threshold temperature. If method 400 judges that one or more aftertreatment devices are operating at less than the threshold temperature, the answer is yes and method 400 proceeds to 406. Otherwise, the answer is no and method 400 proceeds to 450.

At 450, method 400 ceases LPI to engine cylinders and cancels engine operating adjustments that may help to increase engine out exhaust gas temperatures. Method 400 ceases LPI and cancels engine actions to increase engine out exhaust gas temperatures to conserve fuel and improve engine noise and vibration. Method 400 proceeds to exit.

At 406, method 400 may adjust engine operation to increase the temperature of exhaust gases exiting the engine. Method 400 may incrementally increase engine out exhaust gas temperatures via incrementally throttling the engine. Further, method 400 may also incrementally increase engine out exhaust gas temperatures by incrementally retarding start of fuel injection timing. In one example, method 400 may adjust engine throttling and start of fuel injection timing during a cylinder cycle based on a desired temperature increase of the aftertreatment device. Method 400 proceeds to 408.

At 408, method 400 judges if the temperature of at least one of the aftertreatment devices is less than a threshold temperature and if adjustments to increase engine out exhaust gas temperature are at predetermined limits. For example, the method may judge that adjustments to increase engine out exhaust gas temperature are at their limits if start of fuel injection timing is retarded by a predetermined amount (e.g., 10 crankshaft degrees) and the engine throttle has been closed to a predetermined position. Such limits may be provided to meet engine noise, vibration, and performance metrics. If method 400 judges that the temperature of the aftertreatment device is less than a threshold temperature and adjustments to increase engine out exhaust gas temperature are at predetermined limits, then the answer is yes and method 400 proceeds to 412. Otherwise, the answer is no and method 400 proceeds to 410.

At 410, method 400 further adjusts engine operation to increase engine out exhaust gas temperature for the purpose of warming the one or more aftertreatment devices. Method 400 may provide additional throttling to the engine and/or retard start of fuel injection timing and combustion phasing so that engine out exhaust gas temperatures may be increased to higher temperatures. Method 400 returns to 408.

At 412, method 400 determines a desired or requested LPI amount. In one example, method 400 retrieves the requested LPI amount from a function or table that holds empirically determined amounts of LPI. The table or function may be referenced or indexed in response to a desired exotherm (e.g., temperature increase of an aftertreatment device from the aftertreatment device's present temperature). The LPI amount may be indicated in grams/engine cycle or other appropriate units. Thus, if it is desired to increase temperature of the exhaust aftertreatment device by 5° C., the table or function may be referenced by the value of 5° C. The table outputs an amount of LPI that corresponds to the 5° C. exotherm. Method 400 proceeds to 414 after determining the requested LPI amount.

At 414, method 400 determines an actual total number of engine cylinders that are available for LPI. In one example, method 400 determines cylinders that are available to receive LPIs to increase aftertreatment device temperature depending on engine operating conditions including but not limited to driver demand torque, active/deactivated cylinder operating modes, cylinder bank associated with the aftertreatment device for which a temperature increase is desired, and minimum engine temperature for supplying a LPI.

Specifically, during part engine load conditions when driver demand is greater than a first threshold and less than a second threshold driver demand, some engine cylinders may be deactivated. The intake and exhaust valves of the deactivated cylinders may be held closed for more than one engine cycle (e.g., four strokes of an engine cylinder). Therefore, LPIs to deactivated cylinders may not be allowed since the injected fuel would not be directed to the aftertreatment device in a timely manner. Thus, the deactivated cylinders may not be available for LPIs while the activated cylinders may be available to receive LPIs.

Further, it may be desirable to increase a temperature of an aftertreatment device that is in fluidic communication with cylinders included in a first bank of engine cylinders but not cylinders included in a second bank of engine cylinders. Cylinders included in the second bank of engine cylinders are not available for LPIs to raise the temperature of the aftertreatment device that is in fluidic communication with the first bank of engine cylinders but not the second bank of engine cylinders because LPIs to cylinders in the second bank of engine cylinders would have no effect on increasing temperature of the aftertreatment device that is in sole fluidic communication with cylinders included in the first bank of engine cylinders. However, cylinders in the first bank of cylinders may be available to receive LPIs. Likewise, it may be desirable to increase a temperature of an aftertreatment device that is in fluidic communication with cylinders included in a second bank of engine cylinders but not cylinders included in a first bank of engine cylinders. Cylinders included in the first bank of engine cylinders are not available for LPIs to raise the temperature of the aftertreatment device that is in fluidic communication with the second bank of engine cylinders but not the first bank of engine cylinders because LPIs to cylinders in the first bank of engine cylinders would have no effect on increasing temperature of the aftertreatment device that is in sole fluidic communication with cylinders included in the second bank of engine cylinders. However, cylinders in the second bank of cylinders may be available to receive LPIs.

In still another example, no engine cylinders may be available for LPIs when engine temperature is less than a threshold temperature. Providing LPIs to engine cylinders at very low engine temperatures right after an engine start may not be as beneficial as is desired to increase the temperature of the aftertreatment device. Therefore, engine cylinders may not be available for LPI.

Cylinders that are available for LPI are determined from engine and vehicle operating conditions and they may be stored in a vector or array in controller memory. The quantity of cylinders that are available for LPI to increase a temperature of a particular exhaust aftertreatment device is determined by summing the number of individual cylinders that may be available for LPI. Method 400 proceeds to 416.

At 416, method 400 determines a minimum LPI amount for engine cylinders that will receive a LPI. The LPI amount may be based on a minimum fuel injector pulse width. The minimum fuel injector pulse width may be the lowest fuel injector pulse width that provides a repeatable amount of fuel from the fuel injector and is proportionate to the pulse width. For example, a fuel injector minimum pulse width may be 100 microseconds to provide X grams of fuel. If the fuel injector is commanded by a pulse width less than 100 microseconds, then the fuel injector may provide an amount of fuel that is not proportional to the pulse width. Thus, output of the fuel injector may be linear for pulse widths greater than 100 microseconds and non-linear for pulse widths of less than 100 microseconds. The minimum LPI amount may be equal to the amount of fuel provided by a fuel injector at the fuel injector's minimum pulse width. Consequently, LPIs may not be commanded to provide a fuel amount that is less fuel than a fuel amount provided when the fuel injector is commanded to be a minimum pulse width of the fuel injector. In one example, the minimum pulse width and the amount of fuel injected by an injector when commanded by a minimum pulse width is stored in controller memory and is retrieved from memory at 416. Method 400 proceeds to 418.

At 418, method 400 judges if the LPI amount determined at 412 divided by the actual total number of cylinders available for LPI is less than the minimal LPI amount determined at 416. For example, if an engine has four cylinders and all four cylinders are available for LPI, the requested amount of LPI is 0.1 gram/engine cycle, and the minimum LPI amount is 0.03 grams/engine cycle, then method 400 divides 0.1 gram/engine cycle by a value of four to produce a result of 0.025, which is less than 0.03. Therefore, the answer is yes and method 400 proceeds to 422 of FIG. 5. However, if the requested amount of LPI 1 is 0.1 gram/engine cycle, and the minimum LPI amount is 0.02 grams/engine cycle, then method 400 divides 0.1 gram/engine cycle by a value of four to produce a result of 0.025, which is greater than 0.02. As such, the answer is no and method 400 proceeds to 420. If method 400 judges that the LPI amount determined at 412 divided by the actual total number of cylinders available for LPI is less than the minimal LPI amount determined at 416, then the answer is yes and method 400 proceeds to 422. Otherwise, the answer is no and method 400 proceeds to 420.

Thus, at 418, an indication (e.g., answer YES) that providing a threshold amount of fuel (e.g., an amount of fuel in a minimum fuel pulse width injection) in a LPI to each cylinder included in an actual total number of engine cylinders provides more fuel than a requested amount of fuel to increase a temperature of an aftertreatment device is provided.

At 420, method 400 delivers the amount of fuel equal to the result of dividing the LPI amount determined at 412 by the actual total number of cylinders that are available to receive LPI as determined at 414 to all engine cylinders that are available for LPI. For example, for the four cylinder engine with four cylinders available for LPI mentioned previously, if the requested amount of LPI is 0.1 gram/engine cycle, and the minimum amount of LPI is 0.02 grams/engine cycle, then method 400 injects 0.025 grams/engine cycle (0.1 gram/engine cycle÷4) of fuel to each of the cylinders that are available to receive late post injection LPIs. Method 400 proceeds to exit after providing the LPIs.

At 422, method 400 determines an actual total number of engine cylinders in which LPI is performed. Further, method 400 determines an amount of fuel to inject to via LPI to engine cylinders. In one example, method 400 divides the requested late post fuel injection amount determined at 412 by the actual total number of cylinders that are available to receive LPI determined at 416. If the result of the division is less than the amount of fuel injected for a minimum LPI, then the actual total number of cylinders that are available to receive LPI is reduced by one and the division is performed again. This process may be repeated until the requested LPI amount for each cylinder receiving LPI during each engine cycle is greater than the minimum LPI amount. The result of the most recent division is the requested LPI amount for each cylinder receiving LPI each engine cycle. The actual total number of cylinders receiving LPI fuel is the lowest number of actual total number of cylinders that are available to receive LPI. If the actual total number of cylinders that are available to receive LPI is reduced to zero, a single LPI may be performed during the engine cycle to increase the aftertreatment device temperature.

For example, if an engine has four cylinders and all four cylinders are available for LPI, the requested amount of LPI is 0.1 gram/engine cycle, and the minimum amount of LPI is 0.03 grams/engine cycle, then method 400 divides 0.1 gram/engine cycle by a value of four to produce a result of 0.025, which is less than 0.03. Therefore, the actual total number of cylinders that are available to receive LPI is reduced to 3 and then the requested amount of LPI is 0.1 gram/engine cycle is divided by 3 to yield a result of 0.0333, which is greater than 0.03. As a result, the actual total number of cylinders receiving LPI during an engine cycle is three (the number that the actual total number of cylinders that are available to receive LPI has been reduced to) and the requested LPI amount for each cylinder receiving LPI each engine cycle is 0.0333 gram/engine cycle. Method 400 proceeds to 424.

At 424, method 400 selects cylinders to receive fuel during an engine cycle. In one example, method 400 selects engine cylinders that have provided the least number of LPIs according to LPI records for a predetermined number of engine cycles where LPI has been requested. Further, the actual total number of cylinders selected from the cylinders that have provided the least number of LPIs is equal to the actual total number of cylinders receiving LPIs as determined at 422.

For example, if the engine is a four cylinder engine where all four cylinders are available to receive LPI, the actual total number of cylinders receiving LPI is two, and LPIs provided in the past by the engine cylinders are: cylinder 1: 12 injections; cylinder 2: 14 injections; cylinder 3: 13 injections; and cylinder 4: 11 injections, then block 212 may select cylinders 1 and 4 to receive fuel for the present or next engine cycle since these cylinders have received fewer LPIs than cylinders 2 and 3. In this way, the actual total number of LPIs provided to each of the engine cylinders may be maintained substantially equal (e.g., within 10 injections) so that fuel injector wear may be equalized throughout the engine.

In addition, method 400 may select cylinders to receive LPI based on engine firing order so that LPIs are provided at equal crankshaft degree intervals so that flow of fuel to the exhaust system is evenly distributed in crankshaft degrees during an engine cycle. For example, if the engine is a four cylinder engine where all four cylinders are available to receive LPIs, the actual total number of cylinders receiving LPI is two, then method 400 may provide LPIs during a first engine cycle via cylinders 1 and 4, where the engine firing order is 1-3-4-2. In the engine cycle immediately following the engine cycle where LPI was provided to cylinders 1 and 4, LPI may be provided to cylinders 3 and 2 so that during each engine cycle, the separation between LPIs is a uniform 180 crankshaft degrees. This may provide more even heating of the exhaust aftertreatment device.

In this way, method 400 may provide small amounts of LPI so that excess fuel is not supplied to heat the aftertreatment device to a temperature that is higher than desired to provide a desired level of aftertreatment device efficiency. Further, the small amounts of LPI may be distributed between engine cylinders in ways that provide more uniform aftertreatment device heating and more uniform fuel injector degradation over time. Further, method 400 selects one or more cylinders to receive LPI from one or more fuel injectors operated at a shortest duration fuel pulse width that is in a linear operating region of one or more fuel injectors based upon the past history of providing LPI from one or more fuel injectors.

Thus, the method of FIGS. 4 and 5 provides for an engine operating method, comprised of providing an indication that a threshold amount of fuel delivered to each engine cylinder provides more than a requested amount of fuel to increase a temperature of an aftertreatment device, providing LPIs to fewer than the actual total number of engine cylinders via a controller in response to the indication that providing a threshold amount of fuel in a LPI to each of the cylinders included in the actual total number of engine cylinders provides more than a requested amount of fuel to increase a temperature of an aftertreatment device. The engine includes where the threshold amount of fuel is an amount of fuel provided via a fuel injector when a minimum duration pulse width is provided to the fuel injector. The engine method includes where the minimum duration pulse width is a shortest duration pulse width for which fuel delivered via the fuel injector is proportionate to a pulse width provided to the fuel injector. The engine method includes where each of the LPIs are provided during a cylinder cycle after combustion of a main fuel injection. The engine method includes where adjusting start of fuel injection timing includes retarding fuel injection timing responsive to a combustion phasing in an engine cylinder. The engine method further comprises selecting cylinders to receive LPIs in response to a record of cylinders that received LPIs at an earlier time. The engine method further comprises selecting cylinders to receive LPIs in response to cylinders that are available to receive LPIs. The engine method includes where the cylinders that are available to receive LPIs do not include deactivated cylinders.

The method of FIGS. 4 and 5 also provide for an engine operating method, comprising: via a controller, selecting one or more cylinders to receive LPI from one or more fuel injectors operated at a shortest duration fuel pulse width that is in a linear operating region of one or more fuel injectors based upon or responsive to a past history of providing LPI from one or more fuel injectors; and supplying LPI to one or more selected cylinders via the controller. The engine method further comprises providing LPIs to fewer than the actual total number of engine cylinders via the controller in response to an indication that providing a threshold amount of fuel in LPIs to each of the cylinders included in the actual total number of engine cylinders provides more than a requested amount of fuel to increase a temperature of an aftertreatment device. The engine method includes where one or more cylinders are selected further based on the actual total number of cylinders available to receive LPI. The engine method includes where one or more cylinders are selected further based on a requested amount of LPI. The engine method also includes where the requested amount of LPI is based on a desired temperature change of an aftertreatment device. The engine method includes where selecting one or more cylinders is in response to a temperature of an aftertreatment device.

Referring now to FIG. 6, an example engine 10 is shown having a plurality of cylinders 30. The cylinders are numbered 1-8 and the cylinders are arranged in a first bank 602 and a second bank 604. Each of the engine's cylinders may receive fuel from a fuel injector as is shown in FIG. 1.

Referring now to FIG. 7, an example plot of an operating region of a fuel injector is shown. The vertical axis represents the amount of fuel that is injected by the fuel injector and the horizontal axis represents the fuel pulse width of the fuel injector (e.g., a duration in time). The amount of fuel injected increases in the direction of the vertical axis arrow. The fuel pulse width duration increases in the direction of the horizontal axis arrow.

The fuel pulse width of the length indicated by region A is a minimum fuel pulse width where the amount of fuel injected by the fuel injector is proportionate to the fuel pulse width and the voltage command pulse width provided to the fuel injector via the controller. Fuel pulse widths corresponding to fuel injector voltage commands that are less than the duration of region A provide inconsistent and non-linear fuel amounts with respect to the voltage command pulse width. The fuel pulse widths indicated by region B are greater or longer in duration than the minimum fuel pulse width A and the amount of fuel injected by the fuel injector is proportionate to the fuel pulse width and the voltage command pulse width provided to the fuel injector via the controller. Fuel pulse widths corresponding to fuel injector voltage commands that are in region B provide consistent and linear fuel amounts with respect to the voltage command pulse width.

Note that the example control and estimation routines included herein can be used with various engine and/or vehicle system configurations. The control methods and routines disclosed herein may be stored as executable instructions in non-transitory memory and may be carried out by the control system including the controller in combination with various sensors, actuators, and other engine hardware. Further, portions of the methods may be physical actions taken in the real world to change a state of a device.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
providing late post injections (LPIs) to fewer than a total number of engine cylinders via a controller in response to an indication that providing a threshold amount of fuel in LPIs to each of the cylinders included in the total number of engine cylinders provides more than a requested amount of fuel to increase a temperature of an aftertreatment device.

2. The engine operating method of claim 1, where the threshold amount of fuel is an amount of fuel provided via a fuel injector when a minimum duration pulse width is provided to the fuel injector.

3. The engine operating method of claim 2, where the minimum duration pulse width is a shortest duration pulse width for which fuel delivered via the fuel injector is proportionate to a pulse width provided to the fuel injector.

4. The engine operating method of claim 1, where each of the LPIs is provided during a cylinder cycle after combustion of a main fuel injection.

5. The engine operating method of claim 1, further comprising retarding fuel injection timing responsive to combustion phasing in an engine cylinder.

6. The engine operating method of claim 1, further comprising selecting cylinders to receive the LPIs in response to a record of cylinders that received LPIs at an earlier time.

7. The engine operating method of claim 1, further comprising selecting cylinders to receive the LPIs in response to cylinders that are available to receive LPIs.

8. The engine operating method of claim 7, where the cylinders that are available to receive LPIs do not include deactivated cylinders.

9. An engine operating method, comprising:
via a controller, selecting one or more cylinders to receive late post injections (LPIs) from one or more fuel injectors operated at a shortest duration fuel pulse width that is in a linear output region of an amount of fuel injected with respect to fuel pulse width based upon history of providing LPIs from the one or more fuel injectors; and
supplying LPIs to the one or more selected cylinders via the controller.

10. The engine operating method of claim 9, further comprising providing LPIs to less than an actual total number of engine cylinders via the controller in response to an indication that providing a threshold amount of fuel in LPIs to each of the cylinders included in the actual total number of engine cylinders provides more than a requested amount of fuel to increase a temperature of an aftertreatment device.

11. The engine operating method of claim 9, where the one or more cylinders are selected further based on an actual total number of cylinders available to receive LPIs.

12. The engine operating method of claim 9, where the one or more cylinders are selected further based on a requested amount of LPIs.

13. The engine operating method of claim 12, where the requested amount of LPIs is based on a desired temperature change of an aftertreatment device.

14. The engine operating method of claim 9, where selecting the one or more cylinders is in response to a temperature of an aftertreatment device.

15. An engine system, comprising:
a diesel engine including a plurality of cylinders and fuel injectors supplying fuel to the cylinders; and
a controller including executable instructions stored in non-transitory memory to supply late post injections (LPIs) to fewer than an actual total number of cylinders included in the engine in response to an indication that supplying LPIs to each of the plurality of cylinders provides more than a determined amount of fuel to increase a temperature of an aftertreatment device.

16. The engine system of claim 15, further comprising additional instructions to select one or more of the plurality of cylinders to receive LPIs from the fuel injectors operating at a shortest duration fuel pulse width that is in a linear output region of the fuel injectors based upon previously providing LPIs from the fuel injectors.

17. The engine system of claim 15, further comprising additional instructions to adjust operation of the diesel engine to increase temperature of exhaust gases produced via the diesel engine.

18. The engine system of claim 15, where supplying the LPIs is in response to the temperature of the aftertreatment device that is in fluidic communication with the diesel engine.

19. The engine system of claim 15, further comprising additional instructions to determine an actual total number of the plurality of cylinders receiving the LPIs.

* * * * *